US008838944B2

(12) United States Patent  
Chen et al.

(10) Patent No.: US 8,838,944 B2
(45) Date of Patent: Sep. 16, 2014

(54) FAST CONCURRENT ARRAY-BASED STACKS, QUEUES AND DEQUES USING FETCH-AND-INCREMENT-BOUNDED, FETCH-AND-DECREMENT-BOUNDED AND STORE-ON-TWIN SYNCHRONIZATION PRIMITIVES

(75) Inventors: Dong Chen, Yorktown Heights, NY (US); Alana Gara, Yorktown Heights, NY (US); Philip Heidelberger, Yorktown Heights, NY (US); Sameer Kumar, White Plains, NY (US); Martin Ohmacht, Yorktown Heights, NY (US); Burkhard Steinmacher-Burow, Boeblingen (DE); Robert Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1274 days.

(21) Appl. No.: 12/564,535

(22) Filed: Sep. 22, 2009

(65) Prior Publication Data

US 2011/0072241 A1   Mar. 24, 2011

(51) Int. Cl.
 *G06F 9/52* (2006.01)
 *G06F 9/54* (2006.01)
(52) U.S. Cl.
 CPC . *G06F 9/52* (2013.01); *G06F 9/546* (2013.01)
 USPC ............................. 712/225; 711/150; 718/104
(58) Field of Classification Search
 CPC ........ G06F 9/30087; G06F 9/52; G06F 9/546
 USPC ................... 712/220, 225; 711/150; 718/104
 See application file for complete search history.

(56) References Cited

U.S. PATENT DOCUMENTS

| | | | | |
|---|---|---|---|---|
| 5,202,988 A | * | 4/1993 | Spix et al. | 709/234 |
| 5,706,515 A | * | 1/1998 | Connelly et al. | 718/106 |
| 7,000,234 B1 | * | 2/2006 | Shavit et al. | 719/315 |
| 7,346,753 B2 | * | 3/2008 | Chase et al. | 711/170 |
| 7,797,503 B2 | * | 9/2010 | Bellofatto et al. | 711/163 |
| 2007/0006232 A1 | * | 1/2007 | Bliss | 718/100 |

OTHER PUBLICATIONS

Lipovski, G. J. et al., Fetch-and-OP Implementation for Parallel Computers. Proceedings 15th Annual International Symposium Computer Architecture, 1988. pp. 384-392 http://ieeexplore.ieee.org/xpls/abs_all.jsp?arnumber=5249.

M. Micheal et al., Nonblocking Algorithms and Preemption-Safe Locking on Multiprogrammed Shared Memory Multiprocessors, Journal of Parallel and Distributed Computing, 1998, 1-26, 51(1), http://www.research.ibm.com/people/m/michael/jpdc-1998.pdf.

(Continued)

*Primary Examiner* — David J Huisman
(74) *Attorney, Agent, or Firm* — Scully, Scott, Murphy & Presser, P.C.; Daniel P. Morris, Esq.

(57) ABSTRACT

Implementation primitives for concurrent array-based stacks, queues, double-ended queues (deques) and wrapped deques are provided. In one aspect, each element of the stack, queue, deque or wrapped deque data structure has its own ticket lock, allowing multiple threads to concurrently use multiple elements of the data structure and thus achieving high performance. In another aspect, new synchronization primitives FetchAndIncrementBounded (Counter, Bound) and FetchAndDecrementBounded (Counter, Bound) are implemented. These primitives can be implemented in hardware and thus promise a very fast throughput for queues, stacks and double-ended queues.

13 Claims, 12 Drawing Sheets

(56) References Cited

OTHER PUBLICATIONS

Zhen Fang et al., Fast Synchronization on Shared-Memory Multiprocessors: An Architectural Approach, Journal of Parallel and Distributed Computing, 2005, pp. 1158-1170, vol. 65, http://www.cs.utah.edu/~zfang/jpdc05.pdf.

J. M. Mellor-Crummey et al., M. L. Algorithms for Scalable Synchronization on Shared Memory Multiprocessors, ACM Trans. Comp. Syst. C-9 (1), 1991, pp. 21-65, http://citeseer.ist.psu.edu/72993.html.

Philippas Tsigas et. al., A Simple, Fast and Scalable Non-Blocking Concurrent FIFO queue for Shared Memory Multiprocessor Systems, In the Proceedings of the 13th Annual ACM Symposium on Parallel Algorithms and Architectures (SPAA '01), pp. 134-143, 2001 ACM press, http://www.cs.chalmers.se/~tsigas/papers/latest-spaa01.pdf.

Arora, N. S. et. al., Thread scheduling for multiprogrammed multiprocessors. Theory of Computing Systems 34, 2 (2001), 115-144, http://citeseer.ist.psu.edu/arora98thread.html.

Herlihy, M., Wait-Free Synchronization, ACM Transactions on Programming Languages and Systems, 13 (1):124-149, Jan. 1991, http://www.cs.brown.edu/~mph/Herlihy91/p124-herlihy.pdf.

Herlihy, M. P., Wing, J. M., Axioms for Concurrent Objects, Proceedings of the 14th ACM Symposium on Principles of Programming Languages (Jan. 1987), pp. 13-26, http://www.cs.cmu.edu/~wing/publications/HerlihyWing87a.pdf.

Zhen Fang et al., Active Memory Operations, 21st International Conference on Supercomputing(ICS), 2007, 10 pages, http://www.cs.utah.edu/~retrac/papers/ics07.pdf.

E. Freudenthal et al., Process Coordination with Fetch-and-Increment, In Proceedings of the 4th International Conference on Architecture Support for Programming Languages and Operating Systems, Apr. 1991, pp. 1-17, Santa Clara, California, http://rlab.cs.utep.edu/~freudent/homepage/pubs/ucn159.pdf.

David Chase et. al., Dynamic Circular Workstealing Deque, SPAA'05, Jul. 18-20, 2005, 8 pages, Las Vegas, Nevada, USA, http://research.sun.com/scalable.pubs/main-10.pdf.

Hunt, G. C. et. al., An Efficient Algorithm for Concurrent Priority Queue Heaps, Information Processing Letters, Nov. 1996, pp. 151-157, http://www.cse.ohio-state.edu/dmrl/papers/heap96.pdf.

* cited by examiner

US 8,838,944 B2

FAST CONCURRENT ARRAY-BASED STACKS, QUEUES AND DEQUES USING FETCH-AND-INCREMENT-BOUNDED, FETCH-AND-DECREMENT-BOUNDED AND STORE-ON-TWIN SYNCHRONIZATION PRIMITIVES

STATEMENT REGARDING FEDERALLY SPONSORED RESEARCH OR DEVELOPMENT

This invention was made with Government support under Contract No.: B554331 awarded by Department of Energy. The Government has certain rights in this invention.

BACKGROUND OF THE INVENTION

The present invention relates generally to computer systems and, particularly to a method and system for implementing concurrent array-based data structures such as queues, stacks and double-ended queues.

A concurrent data structure refers to a data structure used concurrently by multiple application threads. Concurrent accesses to the concurrent data structure have to be synchronized to avoid corrupting the data structure or its contents.

The concurrent data structures discussed in this disclosure are stacks, queues and deques. A deque is a double-ended queue similar to an ordinary queue, except that the deque allows inserting and deleting from the front and back.

In an array-based concurrent data structure, each element or object in the data structure is an element in the array. An element in the array might store the data object or might store a pointer to the data object. The maximum number of objects in the data structure is given by the number of elements in the array. At any given instance, each array element stores either nothing or a single data object of the application. To have a single terminology across the various data structures, a thread is said to put an object into the data structure. Such a thread is said to be a putter. A thread is said to take an object from the data structure. Such a thread is said to be a taker. After an object is taken from the data structure, the corresponding array element stores no object and thus is free and available for some future thread wishing to put an object. Thus, as threads put objects into and take objects from the data structure, each element of the array is used and re-used for different objects. In other words, successive objects pass through each element of the array.

In applications on multiprocessor systems, a common performance bottleneck occurs due to concurrent array-based data structures such as a concurrent queue, deque or stack. Thus, it is desirable to provide a method and system to improve the performance of concurrent array-based data structures (e.g., make the data structure have faster access time or increase a throughput of the data structure).

According to the publication by M. Michael and M. Scott in Nonblocking algorithms and preemption-safe locking on multiprogrammed shared—memory multiprocessors, Journal of Parallel and Distributed Computing, 51(1):1-26, 1998:

In general, efficient data-structure-specific nonblocking algorithms outperform both ordinary and preemption-safe lock-based alternatives . . . . An implementation of a data structure is nonblocking (also known as lock-free) if it guarantees that at least one process of those trying to update the data structure concurrently will succeed in completing its operation within a bounded amount of time, assuming that at least one process is active, regardless of the state of other processes. Nonblocking algorithms do not require any communication with the kernel and by definition they cannot use mutual exclusion . . . . No practical nonblocking implementations for array-based stacks or circular queues have been proposed. Using general methodologies would result in inefficient algorithms. For these data structures lock-based algorithms have been the only option.

Thus, a practical fast nonblocking implementation of array-based concurrent stacks, queues and deques would be novel and desirable.

For array-based concurrent stacks, queues and deques, practical prior art implementations are blocking. That is, a putter or taker locks the entire data structure to block other putters or takers. This results in low performance since it limits concurrent operations to one. While other concurrent data structures such as priority queue heaps use nonblocking implementations by locking individual elements of the data structure, no locking of individual elements are known to have been done for practical concurrent stacks, queues and deques.

For array-based stacks, queues and deques, practical high performance by locking individual elements of the data structure would be novel and desirable.

In prior art, synchronized access to shared data is often done using a ticket lock. A ticket lock is a form of inter-thread synchronization. The principles of a ticket lock can be analogized to a scenario in which a person at a service counter initially receives a unique ticket number from a dispenser and then waits until that number is served. For array-based stacks, queues and deques, practical high performance by using a ticket lock per element of the data structure would be novel and desirable.

Concurrent data structures are implemented using synchronization primitives. Examples include various forms of fetch-and-operate. Such a fetch-and-operate primitive atomically reads, modifies and writes a memory location. Known fetch-and-operate primitives include test-and-set, fetch-and-store (also known as swap), fetch-and-add, fetch-and-increment, store-add and compare-and-swap.

If multiple threads concurrently execute fetch-and-increment to the same memory location, the values returned are consecutive integers. These values can then be used as indices into an array with the assurance that each array element is assigned to exactly one process. Fetch-and-increment has been used to implement an array-based queue. A memory location is used to generate producer indices into the array. Another memory location is used to generate consumer indices into the array. A short-coming of that approach is that fetch-and-increment on its own allows a consumer to be assigned to an element for which no producer has yet been assigned. Accordingly, an improved synchronization primitive which prevents a consumer to be assigned to an element for which no producer has yet been assigned is desirable.

Fetch-and-increment may be relatively easily implemented in computer hardware by having a processor core issue a normal load to a special memory address. The memory subsystem recognizes the special address and performs the fetch-and-increment. When many threads concurrently issue fetch-and-increment to the same memory location, such a hardware implementation in the memory subsystem can satisfy a fetch-and-increment operation every few processor clock cycles. Accordingly, a fast and relatively easy hardware implementation is desirable for an improved synchronization primitive which prevents a consumer to be assigned to an element for which no producer has yet been assigned.

BRIEF SUMMARY

A method, system, computer readable medium and a computer program product for improving an operation of the concurrent array-based data structure are provided. The method, in one aspect, may include one or more synchronization primitives each of the one or more synchronization primitives fetching a counter and comparing the counter to a boundary. The one or more synchronization primitives may include one or more of FetchAndIncrementBounded, FetchAndDecrementBounded, or StoreOnTwin, or combinations thereof. FetchAndIncrementBounded may output the counter and then increment the counter if the counter is less than the boundary. The FetchAndIncrementBounded may also output an indication of reaching a bound of the data structure if the counter is not less than the boundary. FetchAndDecrementBounded may output the counter and then decrement the counter if the counter is greater than the boundary. FetchAndDecrementBounded also may output an indication if the counter is not greater than the boundary. StoreOnTwin may set the counter and the boundary to a given value if a previous counter value and the boundary were equivalent to each other, said StoreOnTwin not changing the counter or the boundary if the previous counter value and the boundary were not equivalent.

A system for operating concurrent array-based data structure in multithreaded computing environment, in one aspect, may include one or more synchronization primitives, each of the one or more synchronization primitives fetching a counter and comparing the counter to a boundary, wherein the one or more synchronization primitives include one or more of FetchAndIncrementBounded, FetchAndDecrementBounded, or StoreOnTwin, or combinations thereof FetchAndIncrementBounded may output the counter and then increment the counter if the counter is less than the boundary. FetchAndIncrementBounded also may output an indication of reaching a bound of the data structure if the counter is not less than the boundary. FetchAndDecrementBounded may output the counter and then decrementing the counter if the counter is greater than the boundary. The FetchAndDecrementBounded may also output an indication if the counter is not greater than the boundary. StoreOnTwin may set the counter and the boundary to a given value if a previous counter value and the boundary were equivalent to each other, said StoreOnTwin not changing the counter or the boundary if the previous counter value and the boundary were not equivalent.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

The methodology of the present disclosure is described with respect to three array-based data structures: queue, stack and deque. It should be noted, however, that the present methodology is not limited to only those data structures. A producer thread is known here as a putter. A consumer thread is known as a taker. A queue is stored in an array as a bounded circular-buffer using two indices, putIndex and takeIndex. In a queue, elements are put into and taken from the queue in first-in-first-out (FIFO) order. A stack is stored in an array as a bounded buffer using a single index TopIndex. In a stack, elements are put into and taken from the stack in last-in-first-out (LIFO) order. A double-ended queue is known as a deque. A deque is stored in an array as a bounded buffer using 4 indices, putBottomIndex, takeBottomIndex, putTopIndex and takeTopIndex. In a deque, elements are put into and taken from each of the two ends of the deque.

According to one embodiment of the present disclosure, access to the concurrent data structure is split into two parts. In the first part, a thread uses the new synchronization primitive fetch-and-increment-bounded in order for the thread to be assigned to an element in the data structure. The bounded part returns no element if there is no element available. The fetch-and-increment-bounded primitive has very high throughput in assigning threads to elements and this largely determines the throughput of the data structure. The other new primitives serve similar purposes to fetch-and-increment-bounded. In the second part, the thread uses a ticket lock in order to coordinate with other threads assigned to the same element. This embodiment allows multiple threads to concurrently use multiple elements of the data structure and thus achieve high performance. According to another embodiment, there are also provided new synchronization primitives FetchAndDecrementBounded and StoreOnTwin which are similarly used to assign a thread to an element of a concurrent data structure.

A Ticket Lock per Array Element

Each element of the array-based stack, queue or deque data structure has its own ticket lock. The ticket lock per element may be implemented using a field within each array element. Another implementation of the ticket lock may include a first array storing the data objects accompanied by a second array where each element of the second array provides a lock for the corresponding element of the first array.

FetchAndIncrementBounded and Related Primitives

Figure 1:
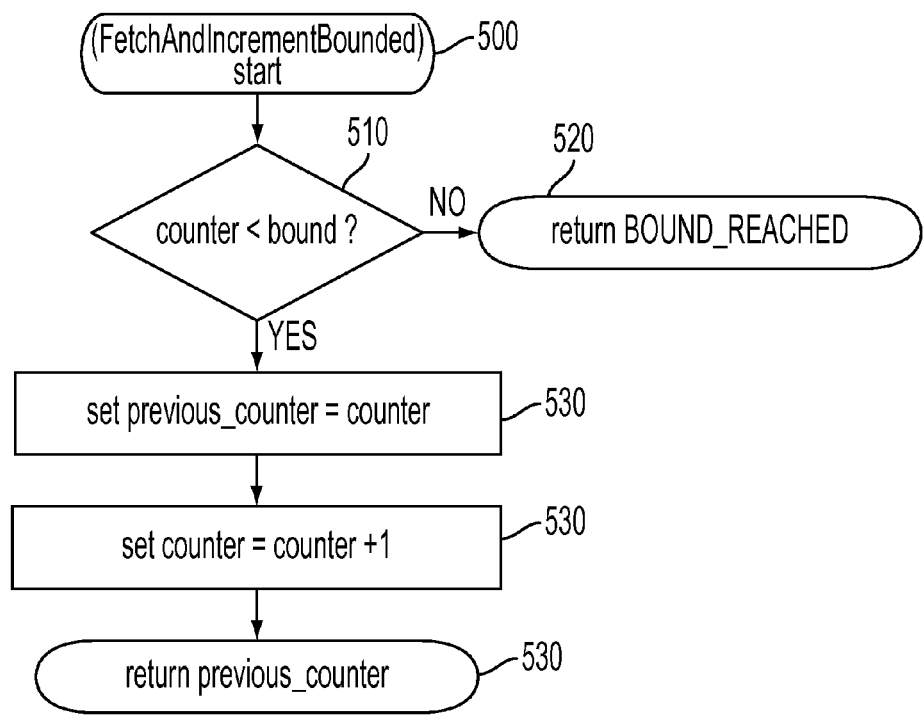
FIG. 1 is a flow diagram illustrating a FetchAndIncrementBounded operation according to one embodiment of the present disclosure.

FIG. 1 illustrates a flow chart of the synchronization primitive FetchAndIncrementBounded operating on two memory locations named as Counter and Bound according to one embodiment of the present disclosure. At step 500, a computing system (e.g., a computing system 1600 in FIG. 11) initiates the FetchAndIncrementBounded primitive. At step 510, the computing system compares the Counter and the Bound. If the Counter is larger than or equal to the Bound, at step 520, the computing system outputs an indication of reaching a bound of a data structure associated with the FetchAndIncrementBounded primitive. Otherwise, the computing system proceeds to execute steps 530-550. At step 530, the computing system stores a current value of the Counter into a memory location referred to herein as "previous_counter". Any other name may be used. At step 540, the computing system increments the current value of the Counter and stores the incremented value to the Counter. At step 550, the computing system outputs the value of the previous_counter.

The following illustrates example pseudo code implementing the FetchAndIncrementBounded primitive according to one embodiment of the present disclosure.

```
uint64_t fetchAndIncrementBounded (uint64_t *ptrBound, uint64_t *ptrCounter) {
    // loop until return counter or bound reached
    while (1) {
        volatile uint64_t bound = *ptrBound;
        volatile uint64_t counter = load_linked64(ptrCounter);
        if (counter < bound) {
            uint64_t nextCounter = ++counter;
            // store_conditional64( ) succeeds if no other thread has modified ptrCounter
            //since above load_linked64( )
            // load_linked/store_conditional thus effectively provides atomic access to ptrCounter int success =
            store_conditional64(ptrCounter, nextCounter);
            if (success) return counter;
        } else {
            return BOUND_REACHED;
        }
    }
}
```

The above pseudo-code implementation of the synchronization primitive FetchAndIncrementBounded (Bound, Counter) assumes that the value of Bound is constant or that other threads may concurrently increase Bound, but never decrease Bound. This simplifies and may improve functionality and performance of the implementation of FetchAndIncrementBounded since the implementation requires atomic access only to Counter, not to both Counter and Bound. If other threads may concurrently decrease Bound, then the synchronization primitive FetchAndIncrementBoundedAtomic (Bound, Counter) described below should be used.

An example pseudocode implementation of FetchAndIncrementBoundedAtomic (Bound, Counter) is illustrated below. The implementation supports a 32-bit Bound and a 32-bit counter, so that the 64-bit synchronization primitives load_linked/store_conditional can be used. In the pseudocode, FetchAndIncrementBoundedAtomic (Bound, Counter) only increments Counter, if neither Counter nor Bound had its value changed by another thread.

```
uint32_t fetchAndIncrementBoundedAtomic32 (uint32_t *ptrBound,
                uint32_t *ptrCounter) {
    // Required order in memory: counter, bound.
    assert(ptrCounter + 1 == ptrBound);
    // loop until return counter or bound reached
    while (1) {
        typedef struct {uint32_t counter, uint32_t bound} IncPair;
        IncPair *ptrPair = (IncPair *)ptrCounter;
        volatile IncPair valPair = load_linked64(ptrPair);
        if (valPair.counter < valPair.bound) {
            IncPair nextPair = { ++valPair.counter, valPair.bound };
            int success = store_conditional64(ptrPair, nextPair);
            if (success) return valPair.counter;
        } else {
            return BOUND_REACHED32;
        }
    }
}
```

Similar to FetchAndIncrementBounded described above is the synchronization primitive FetchAndDecrementBounded, except that in the latter the Counter is decremented if its original value is greater than a value of the Bound. An example pseudocode implementation of fetchAndDecrementBounded( ) may be derived from the above pseudocode implemenatation fetchAndIncrementBounded( ).

Analogous to the above motivation for the FetchAndIncrementBoundedAtomic( ) primitive, if other threads may concurrently increase the Bound, then an atomic version of the synchronization primitive FetchAndDecrementBounded should be used. The following illustrates an example pseudo code implementing the FetchAndDecrementBoundedAtomic primitive according to one embodiment of the present disclosure.

```
uint32_t fetchAndDecrementBoundedAtomic32(uint32_t *ptrBound,
                uint32_t *ptrCounter) {
    // Required order in memory: bound, counter.
    assert(ptrBound + 1 == ptrCounter);
    // loop until return counter or bound reached
    while (1) {
        typedef struct {uint32_t bound, uint32_t counter} DecPair;
        DecPair *ptrPair = (DecPair *)ptrBound;
        volatile DecPair valPair = load_linked64(ptrPair);
        if (valPair.counter > valPair.bound) {
            DecPair nextPair = { valPair.bound, --valPair.counter };
            int success = store_conditional64(ptrPair, nextPair);
            if (success) return valPair.counter;
        } else {
            return BOUND_REACHED32;
        }
    }
}
```

Figure 12:
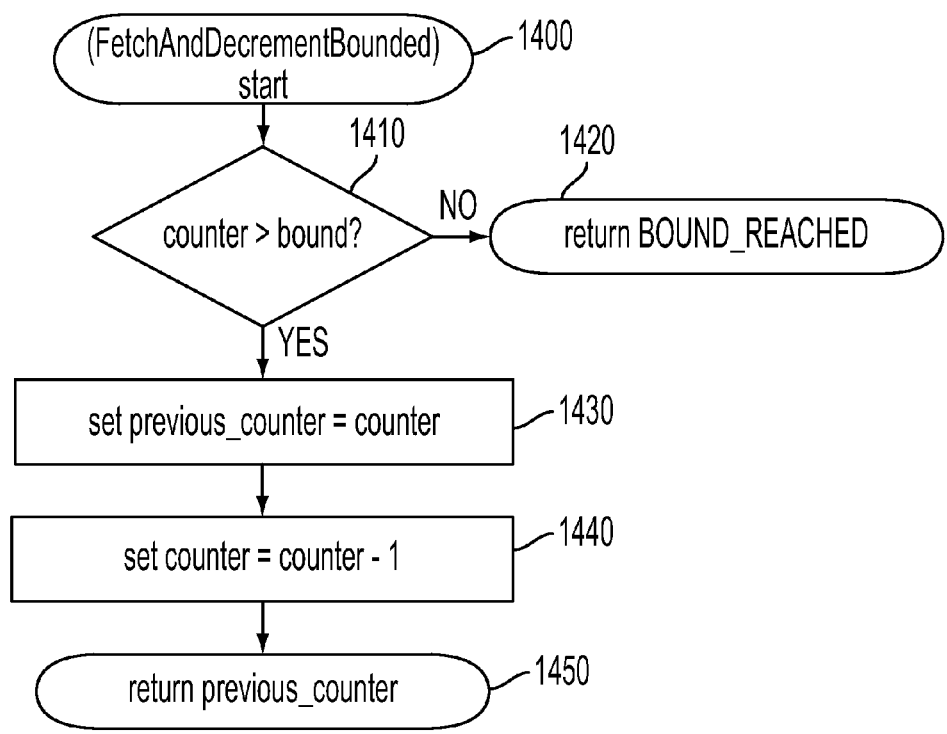
FIG. 12 is a flow diagram illustrating a FetchAndDecrementBounded operation according to one embodiment of the present disclosure.

When executing the FetchAndDecrementBounded primitive, at 1400 in FIG. 12, the computing system compares the Counter and the Bound. If the Counter is less than or equal to the Bound at 1410, the computing system outputs the indication at 1420. Otherwise, the computing system stores a current value of the Counter into a memory location referred to herein as "previous_counter" at 1430. Any other name may be used. Then, at 1440, the computing system decrements the current value of the Counter and stores the decremented value to the Counter. The computing system outputs a value of the previous_counter at 1450.

Figure 10:
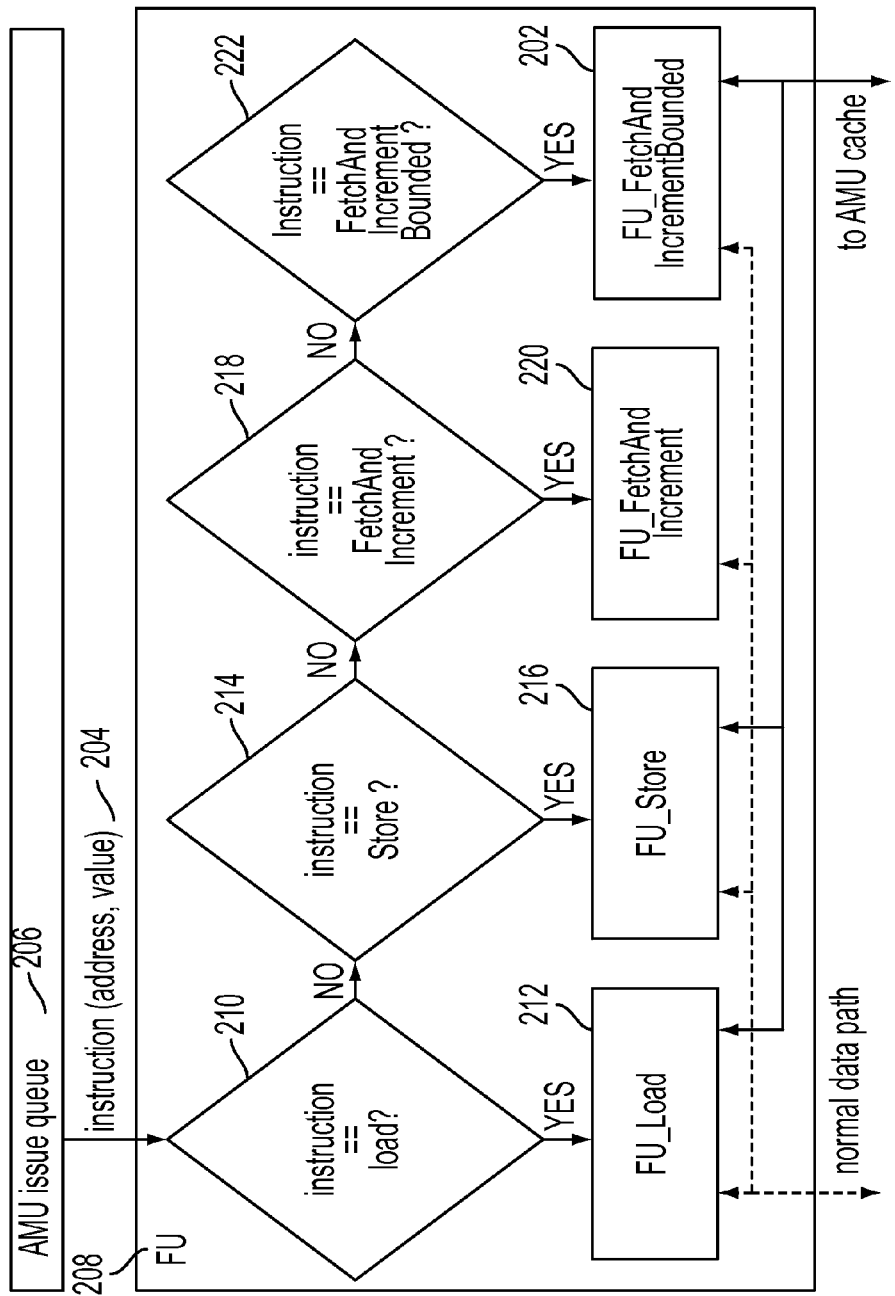
FIG. 10 is a block diagram illustrating the functional unit (FU) of an Active Memory Unit (AMU) with support for the new synchronization primitive FetchAndIncrementBounded according to one embodiment of the present disclosure.

According to one embodiment of the present disclosure, the synchronization primitives are implemented in computer hardware by having a processor core issue a normal load to a special memory address. A memory subsystem recognizes the special address and performs the synchronization primitives. The special address encodes an actual memory address of the Counter to be operated on and encodes which of the synchronization primitives is to be performed. In one implementation, the Bound is defined to be in a memory location adjacent to the Counter, either before or after. When a lot of threads concurrently issue one of the synchronization primitives to the same memory location (e.g., the same memory location corresponding to the Counter), such a hardware implementation can satisfy executing a primitive every few processor clock cycles. An example of hardware implementation is shown in FIG. 10, which will be described below in more detail.

In a further embodiment, the Bound and the Counter may be required to be in the same cache line or other memory block used by a memory subsystem. In a further embodiment, a memory subsystem atomically implements an operation on a cache line. Thus in hardware implementation, FetchAndIncrementBounded may be identical to the atomic version of the FetchAndIncrementBounded. Likewise, the hardware implementation of the FetchAndDecrementBounded may be identical to the atomic version of FetchAndDecrementBounded.

Queue

Figure 2:
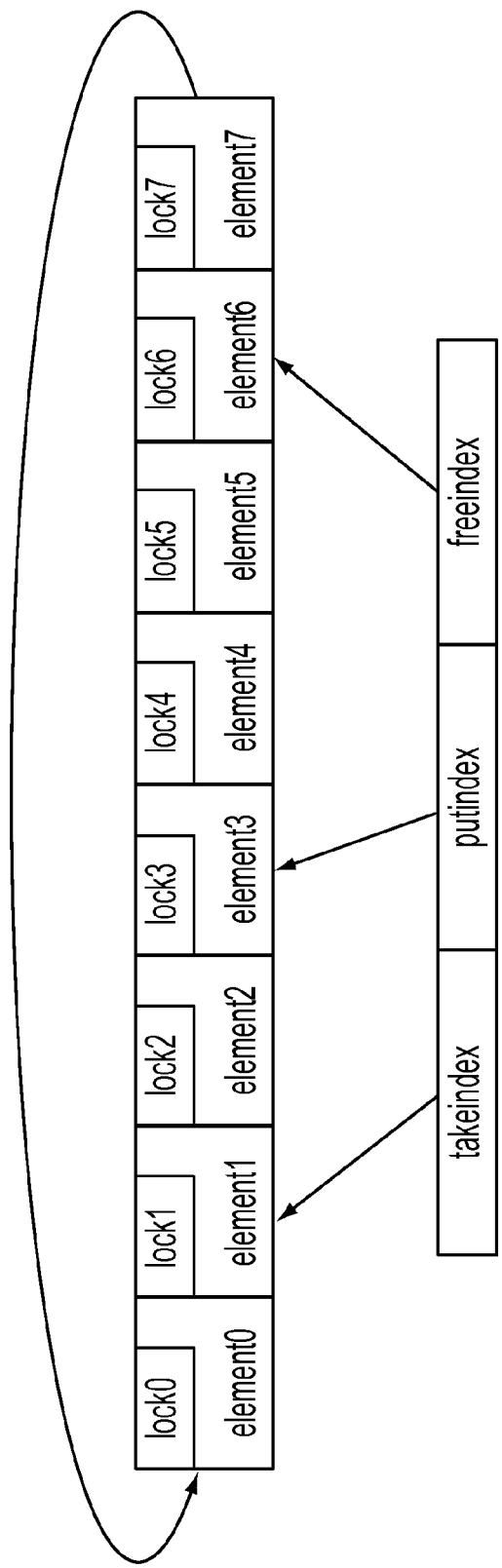
FIG. 2 is a block diagram illustrating an example data structure of a concurrent array-based queue with a ticket lock per element according to one embodiment of the present disclosure.

As known, an array-based concurrent queue uses three memory locations as indices into the array in one embodiment. FIG. 2 is a block diagram illustrating an example data structure of an array-based queue. As illustrated in FIG. 2, the three indices are named freeIndex (i.e., an index to the last element freed by a consumer), putIndex (i.e., an index to the next element where an object is to be inserted) and takeIndex (i.e., an index to the next element where an object is removed). The array used in the queue is a circular buffer, so each index is used modulo the array length.

According to one embodiment of the present disclosure, there is provided a lock per element for a concurrent use. An example pseudo-code data structure definition for queue is shown below.

```
#define BOUND_REACHED 0xFFFFFFFFFFFFFFFF
#define SUCCESS 0
#define EMPTY 1
#define FULL 2
class ProducerConsumerQueue {
  private Object buffer[BUFFER_LENGTH];
    // Lock accompanying each element. -ve for putter. +ve for taker.
  private int64_t turn[BUFFER_LENGTH]; // Initialize to -1 for
  all elements.
  uint64_t freeIndex=2*BUFFER_LENGTH;
  uint64_t putIndex=BUFFER_LENGTH, takeIndex=
  BUFFER_LENGTH;
  public int put(Object x);
  public int take(Object *x);
}
```

According to one embodiment of the present disclosure, the computing system executes the FetchAndIncrementBounded primitive on counter putIndex bounded by freeIndex to obtain an array index for a put operation (i.e., an operation inserting an object) into the queue. A returned value BOUND_REACHED indicates that there are no free elements in the queue. The following illustrates an example pseudo code that implements putting into queue.

```
public int put(Object x) {
  uint64_t myIndex = fetchAndIncrementBounded(&freeIndex,
  &putIndex);
  if (myIndex == BOUND_REACHED) return FULL;
  int64_t myTicket = myIndex/BUFFER_LENGTH;
  // Wrap index onto array.
  myIndex = myIndex % BUFFER_LENGTH;
  // Loop until my element has been freed by previous taker.
  while (-myTicket != turn[myIndex]) ;
  // Insert element.
  Object[myIndex] = x;
  // Ensure data is seen elsewhere before lock.
  msync( );
  // Let taker know this element has been put.
  turn[myIndex] = myTicket;
  return SUCCESS;
}
```

According to one embodiment of the present disclosure, the computing system executes the FetchAndIncrementBounded primitive on takeIndex bounded by putIndex to obtain an array index for a take operation (i.e., an operation removing an object) from the queue. The returned value BOUND_REACHED indicates that there are no objects in the queue. The following illustrates an example pseudo code that implements taking from the queue.

```
public int take(Object *x) {
  uint64_t myIndex = fetchAndIncrementBounded(&putIndex,
  &takeIndex);
  if (myIndex == BOUND_REACHED) return EMPTY;
  int64_t myTicket = myIndex/BUFFER_LENGTH;
  myIndex = myIndex % BUFFER_LENGTH;
  // Loop until my element has been put.
  while (myTicket != turn[myIndex]) ;
  // Take element.
  *x = Object[myIndex];
  // Ensure data is taken above before lock is seen elsewhere.
  mbar( );
  // Let subsequent putter know this element has been taken and freed.
  turn[myIndex] = -(myTicket + 1);
  // Notify putter that there is an element free.
  AtomicIncrement(&freeIndex);
  return SUCCESS;
}
```

According to one embodiment of the present disclosure, for each element of the array-based concurrent queue, there is provided a turn field which is used to implement a ticket lock. The turn field serializes an access to an element by a sequence of putter, taker, putter, taker and so on. Putter refers to a thread inserting an object into the queue and taker refers to a thread removing an object from the queue. As an example, for the turn field, negative values may be used for putters and positive values may be used for takers.

In one embodiment, the array index described above divided by the array length is used as the ticket value. A putter polls the turn field for its ticket value, to ensure that a previous taker has completed an operation on an element associated with the ticket value. The putter then puts its object into the element. The putter then writes its ticket value into the turn field for a subsequent taker.

A taker polls the turn field for its ticket value. The taker then takes its object from an element associated with the ticket value. The taker then writes a sum of its index plus one into the turn field for a subsequent putter. The taker then increments the freeIndex, e.g., using a synchronization primitive StoreIncrement.

As described for the above queue implementation, a putter or taker uses the array index to also calculate the expected ticket value. An alternative would have a separate ticket field in each array element and use fetch-and-increment in order to get the ticket value. This alternative is described below for a stack or queue or wrappedQueue. For the above queue implementation, the ticket value calculation typically occurs within the processor and thus is typically faster than the alternative fetch-and-increment which requires a processor-memory System round-trip communication.

Figure 3:
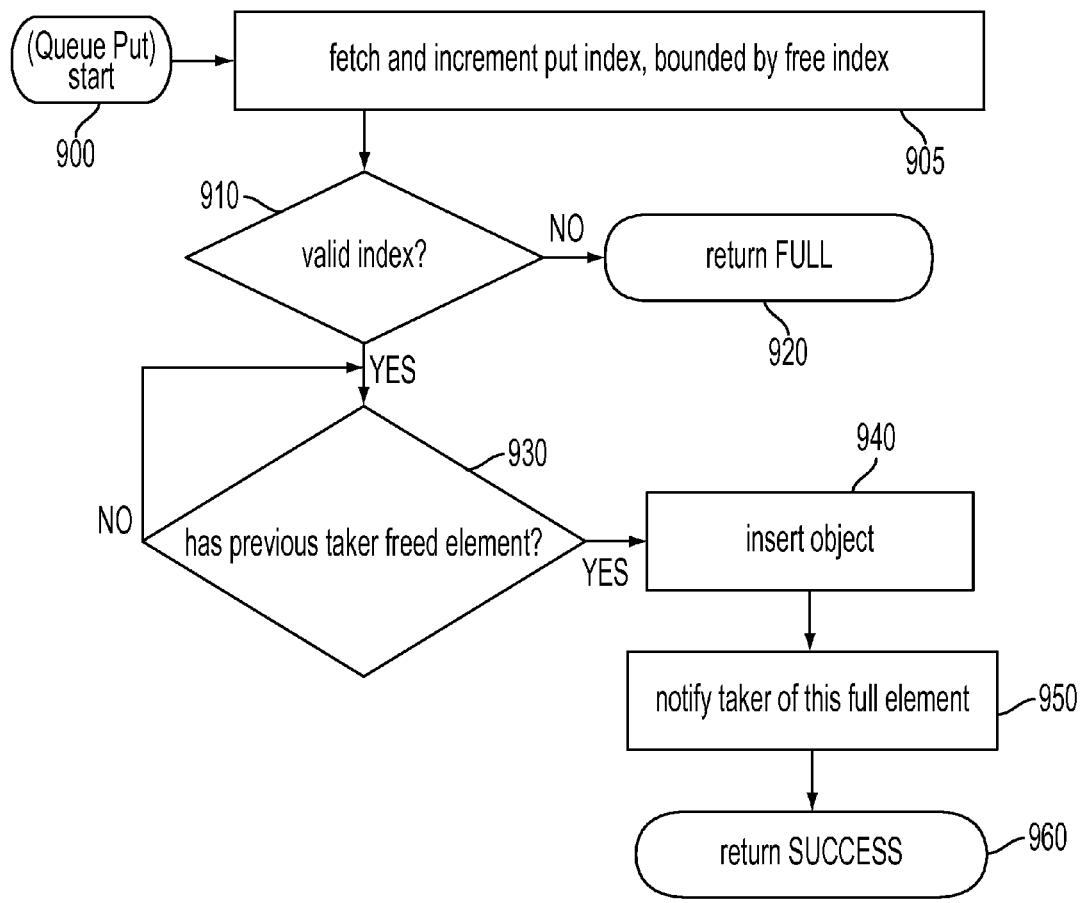
FIG. 3 is a flow diagram illustrating a put operation for a concurrent array-based queue according to one embodiment of the present disclosure.

FIG. 3 illustrates a flow chart having method steps executed by a putter according to one embodiment of the present disclosure. At step 900, the computing system initiates an insertion operation into the queue. At step 905, the computing system executes the FetchAndIncrementBound primitive to obtain an index. At step 910, the computing system verifies whether the index is valid. If the index is invalid (e.g., the index is equal to the special value BOUND_REACHED), at step 920, the computing system outputs an indication that the queue is full. Otherwise, the computing system executes steps 930-960. At step 930, the computing system waits until the element into which that the putter wants to insert an object is freed by a previous taker. If the element becomes free, at step 940, the computing system inserts an object in the element. At step 950, the computing system notifies a taker that an object has been inserted into the element in the queue. At step 960, the computing system completes the insertion operation.

Figure 4:
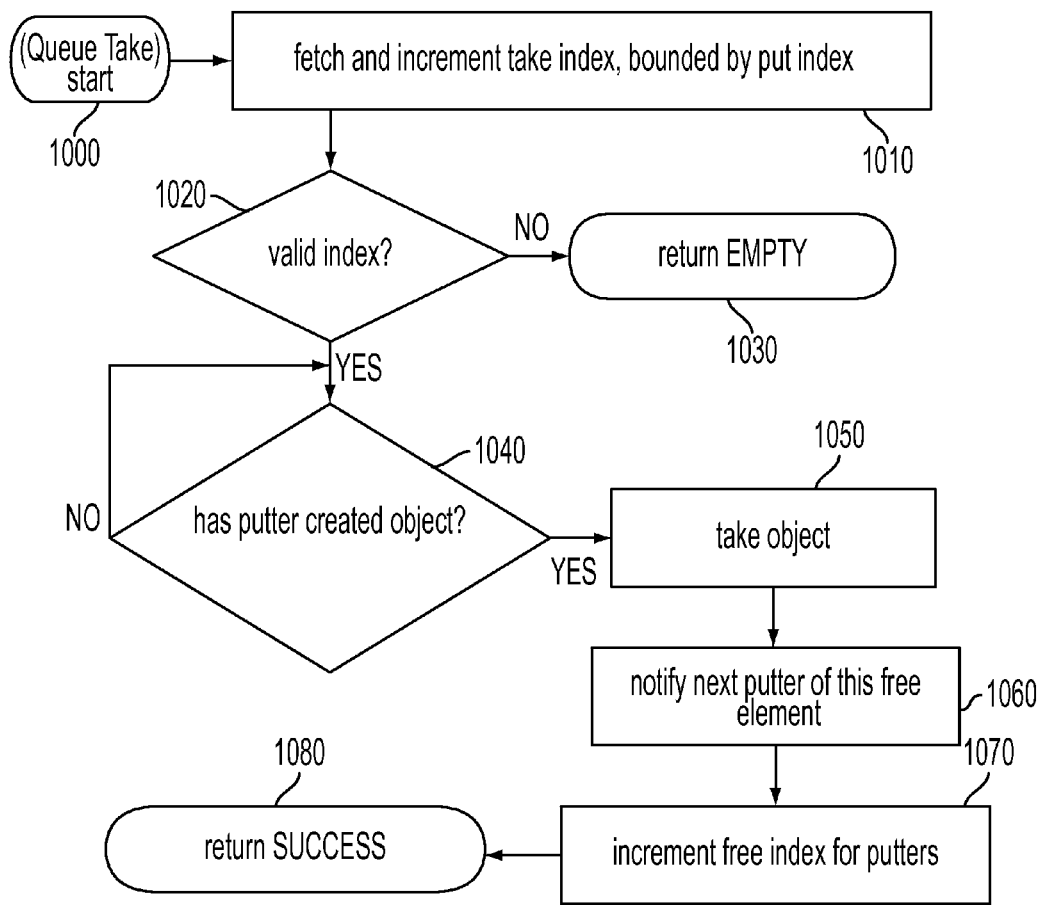
FIG. 4 is a flow diagram illustrating a take operation for a concurrent array-based queue according to one embodiment of the present disclosure.

FIG. 4 illustrates a flow chart having method steps executed by a taker according to one embodiment of the present disclosure. At step 1000, the computing system initiates removing an object in an element in the queue. At step 1010, the computing system executes the FetchAndIncrementBounded primitive to obtain an index. At step 1020, the computing system verifies whether the index is valid. If the index is invalid (e.g., the index is equal to the special value BOUND_REACHED), at step 1030, the computing system outputs an indication that the queue is empty. Otherwise, the computing system executes steps 1040-1080. At step 1040, the computing system waits until the element that the taker wants to remove an object from is created by a putter. In other words, the computing system waits until the element is made available by the putter. At step 1050, the computing system removes the object from the element. At step 1060, the computing system notifies a next putter that the element is not occupied. At step 1070, the computing system increments the freeIndex. At step 1080, the computing system completes the removing (taking) operation.

According to one embodiment, the three indices are each 64-bit values and thus can be used to pass approximately 16 billion*billion objects through the queue. Thus in practice, no index will wrap back to 0, even if the queue serves 1 billion objects per second. Furthermore, the queue can be implemented with an arbitrarily large (e.g., >1012 elements) or small array (e.g., <100 elements), down to a size of a single element.

Variations on the above embodiments are contemplated. For example, the array index could be used as is as a ticket (e.g., put ticket or take ticket), without dividing by the array length. Then, the taker writes a sum of its index plus the array length into the turn field for the subsequent putter. For example, a single turn field with negative values can be for putters and positive values can be used for takers. Alternatively, a single turn field with even values can be used for putters and odd values can be used for takers. For example, instead of having a single turn field, one element can have separate putTurn and takeTurn fields. Those variations are also applicable for stacks and deques described below.

Stack

Figure 5:
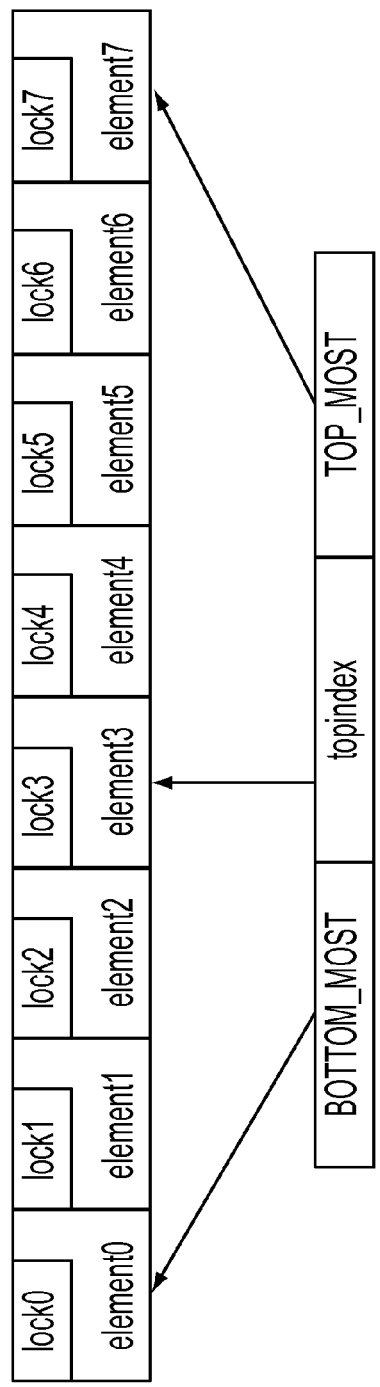
FIG. 5 is a block diagram illustrating an example data structure of a concurrent array-based stack with a ticket lock per element according to one embodiment of the present disclosure.

The array-based concurrent stack is constructed in a fashion similar to the above implementation of the queue. FIG. 5 illustrates an example of an array-based concurrent stack. The array-based concurrent stack illustrated in FIG. 5 uses one memory location topIndex (i.e., an index to the element on the top of the stack) as an index into the array. The constants BOTTOM_MOST and TOP_MOST are the boundaries of the array representing the stack. As illustrated in FIG. 5, there is provided a lock per element for a concurrent use. Pseudo code example defining stack data structure having a lock per element is illustrated below.

```
class Stack {
    private Object buffer[BUFFER_LENGTH];
    private int64_t turn[BUFFER_LENGTH];    // Lock accompanying each element.
    private int64_t putTicket[BUFFER_LENGTH]; // Initialize all elements to 1.
    private int64_t takeTicket[BUFFER_LENGTH];// Initialize all elements to 1.
    uint64_t TOP_MOST = BUFFER_LENGTH;
    uint64_t BOTTOM_MOST = 0;
    uint64_t topIndex = 0;
    public int put(Object x);
    public int take(Object *x);
}
```

According to one embodiment of the present disclosure, the computing system executes the FetchAndIncrementBounded primitive on counter putIndex with bound TOP_MOST to obtain an array index for a put (i.e., an operation inserting an object in an element at the top of the stack). A returned value BOUND_REACHED from the FetchAndIncrementBounded primitive indicates that there are no free elements in the stack. Pseudo code example for putting onto the stack is illustrated below.

```
public int put(Object x) {
    uint64_t myIndex = fetchAndIncrementBounded(&TOP_MOST, &topIndex);
    if (myIndex == BOUND_REACHED) return FULL;
    int64_t myTicket = fetchAndIncrement(&putTicket[myIndex]);
    // Loop until my element has been freed by previous take.
    while (-myTicket != turn[myIndex]) ;
    // Insert element.
    Object[myIndex] = x;
    // Ensure data is seen elsewhere before lock.
    msync( );
    // Let taker know this element has been put.
    turn[myIndex] = myTicket;
    return SUCCESS;
}
```

According to one embodiment of the present disclosure, the computing system executes the FetchAndDecrementBounded primitive on counter topIndex with bound BOTTOM_MOST to obtain an array index for a take (i.e., an operation removing an object in an element from the top of the stack). The returned value BOUND_REACHED from FetchAndDecrementBounded primitive indicates that there are no objects in the stack. Pseudo code example for taking from the stack is illustrated below.

```
public int take(Object *x) {
    uint64_t myIndex =
        fetchAndDecrementBounded(&BOTTOM_MOST, &topIndex);
    if (myIndex == BOUND_REACHED) return EMPTY;
    myIndex = myIndex - 1;
```

-continued

```
int64_t myTicket = fetchAndIncrement(&takeTicket[myIndex]);
// Loop until my element has been put.
while (myTicket != turn[myIndex]) ;
// Take element.
*x = Object[myIndex];
// Ensure data is taken above before lock is seen elsewhere.
mbar( );
// Let subsequent putter know this element has been taken and freed.
turn[myIndex] = -(myTicket + 1);
return SUCCESS;
}
```

Similar to that described above for a queue, for each element of the array-based concurrent stack, there is provided a turn field which is used for a ticket lock. For each element, the ticket lock also has the two fields putTicket (i.e., a ticket for inserting an object into the stack) and takeTicket (i.e., a ticket for removing an object from the stack).

According to one embodiment, a putter (i.e., a thread which wants to insert an object in an element in the stack) obtains its ticket value using a FetchAndIncrement primitive and then polls the turn field for that ticket value, to ensure that a previous taker has completed removing an object in the element. The putter then puts the object into the element. The putter then writes its ticket value into the turn field for a subsequent taker.

In the FetchAndIncrement primitive (e.g., FetchAndIncrement(putTicket)), the computing system inserts the current value of the Counter to the previous_counter. The computing system increments the current value of the Counter and outputs the value of the previous_counter. The following illustrates an example pseudo code of the FetchAndIncrement primitive.

```
uint64_t fetchAndIncrement(uint64_t *ptrCounter) {
    // loop until return counter
    while (1) {
        volatile uint64_t counter = load_linked64(ptrCounter);
        uint64_t nextCounter = ++counter;
        int success = store_conditional64(ptrCounter, nextCounter);
        if (success) return counter;
    }
}
```

A taker (i.e., a thread removing an object in an element in the stack) obtains its ticket value, e.g., by executing the FetchAndIncrement primitive (e.g., FetchAndIncrement(takeTicket)) and then polls the turn field for its ticket value. The taker then takes the object from the element. The taker then writes the value of its ticket plus one into the turn field for a subsequent putter.

The above-described concurrent stack implementation is practical. For example, with 64-bits indices, the implementation allows more than 16 billion*billion elements to pass through the stack. For example, the algorithm works for an arbitrarily large or small array, down to a size of a single element.

Figure 6:
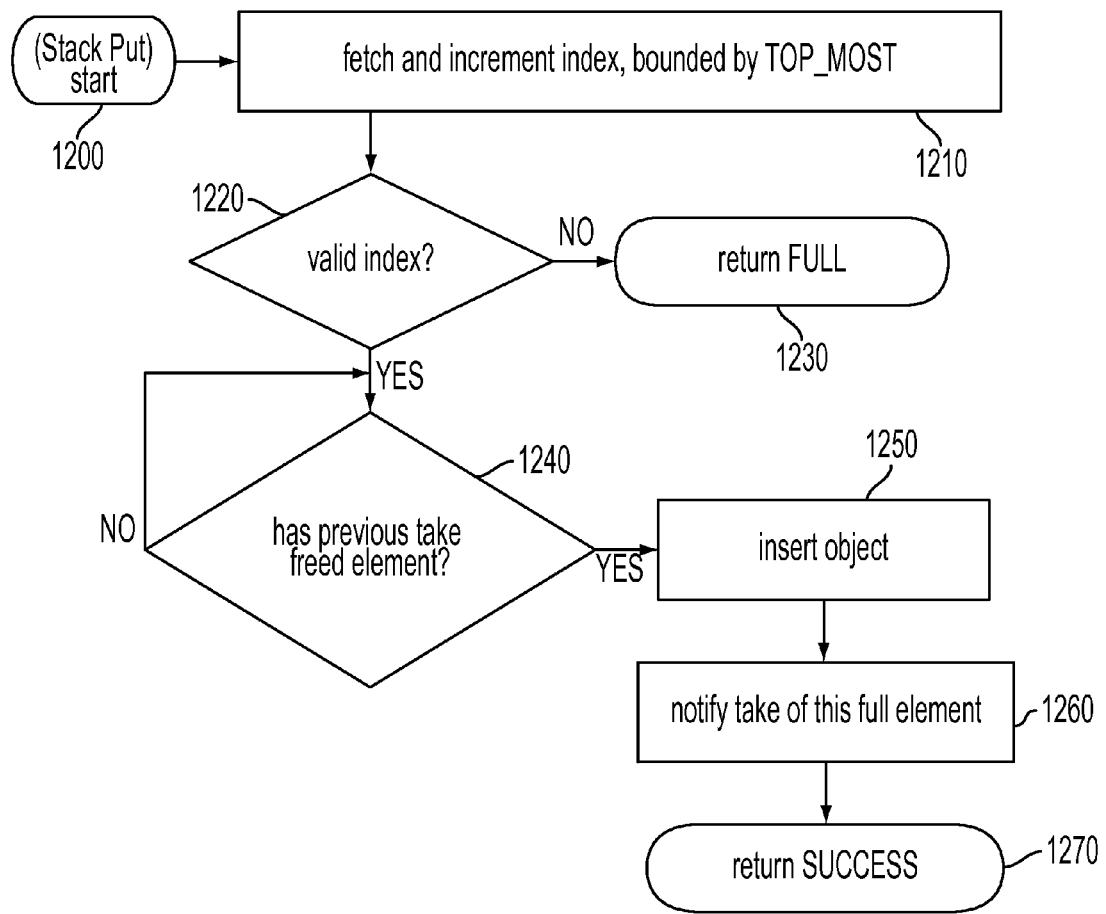
FIG. 6 is a flow diagram illustrating a put operation for a concurrent stack according to one embodiment of the present disclosure.

FIG. 6 illustrates a flow chart having method steps executed by a putter on a stack according to one embodiment of the present disclosure. At step 1200, the computing system initiates a put operation (i.e., an operation inserting an object into the stack). At step 1210, the computing system executes the FetchAndIncrementBounded primitive to obtain an index of an element in the stack where the object is inserted. At step 1220, the computing system validates the index. If the index is invalid, e.g., the index is equal to the special value BOUND_REACHED, at step 1230, the computing system outputs an indication that the stack is full. Otherwise, the computing system executes steps 1240-1270. At step 1240, the computing system waits until the element is freed by a previous taker. When the element becomes freed by the previous taker, at step 1250, the computing system inserts the object into the element in the stack. At step 1260, the computing system notifies that the object is inserted into the element in the stack. At step 1270, the computing system completes the insertion.

Figure 7:
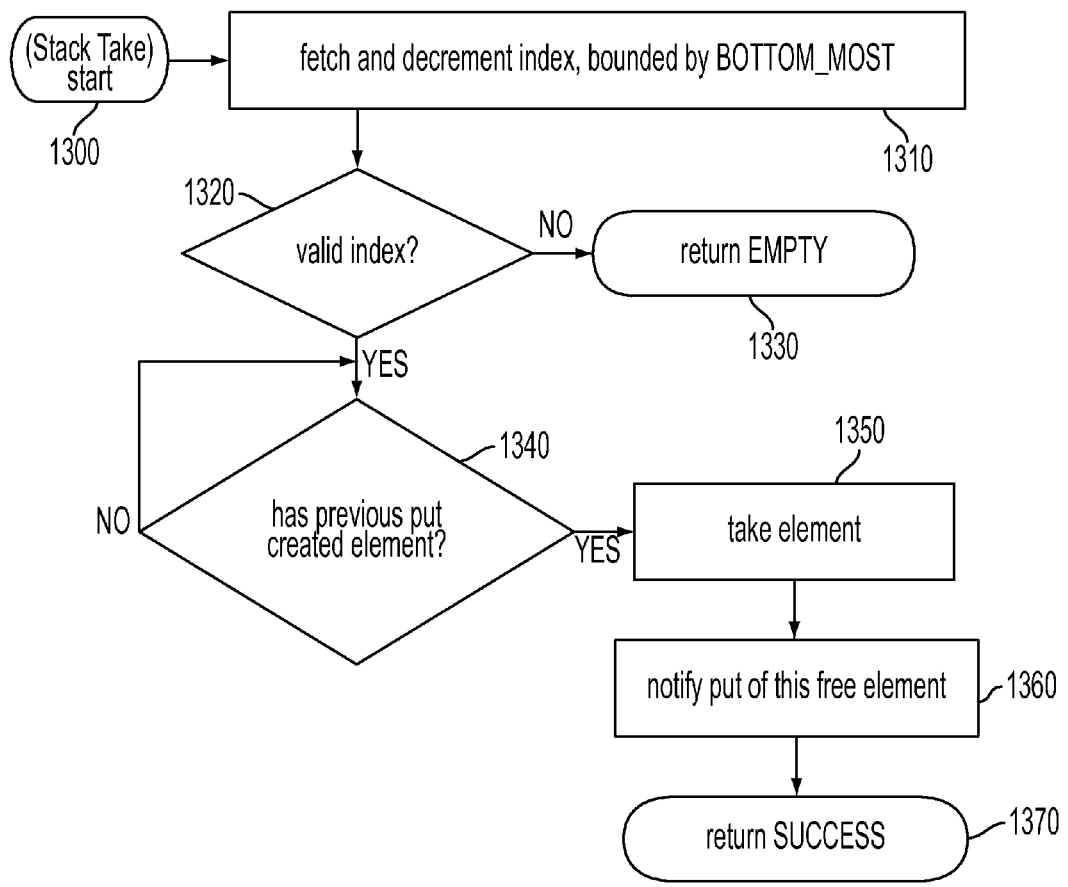
FIG. 7 is a flow diagram illustrating a take operation for a concurrent stack according to one embodiment of the present disclosure.

FIG. 7 illustrates a flow chart having method steps executed by a taker from a stack according to one embodiment of the present disclosure. At step 1300, the computing system initiates removing an object in an element in the stack. At step 1310, the computing system executes the FetchAndDecrementBounded primitive to obtain an index of an element where an object is removed. At step 1320, the computing system validates whether the index is valid. If the index is invalid, e.g., the index is equal to the special value BOUND_REACHED, at step 1330, the computing system outputs an indication that the stack is empty. Otherwise, the computing system executes steps 1340-1370. At step 1340, the computing system waits until a previous putter completes inserting an object in the element. In other words, the computing system waits until the element is made available by the previous putter. At step 1350, the computing system removes the object in the element. At step 1360, the computing system notifies subsequent takers that the element is not occupied. At step 1370, the computing system completes the removing.

Double-Ended Queue (Deque)

Figure 8:
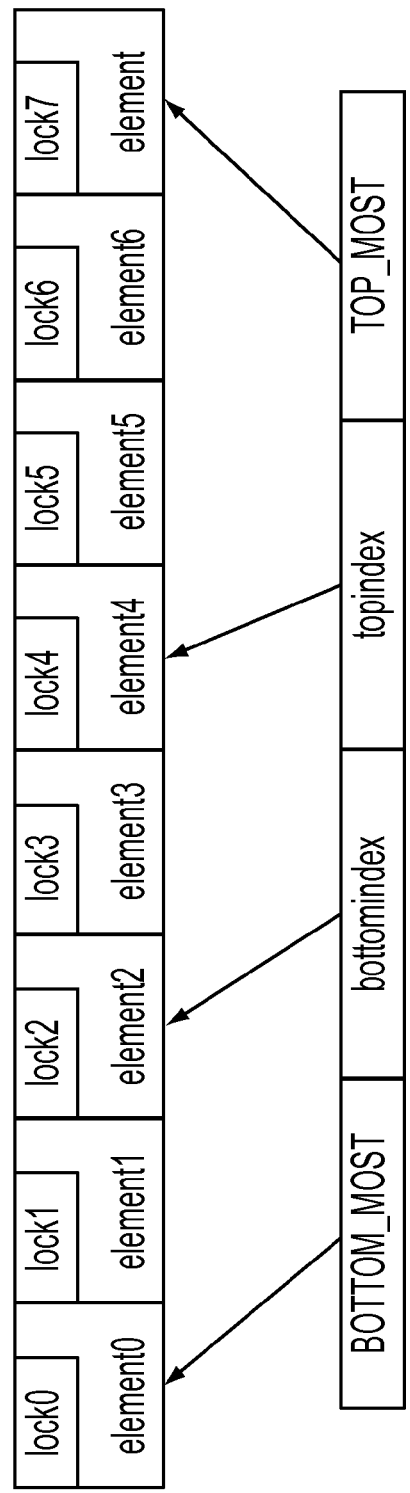
FIG. 8 is a block diagram illustrating an example data structure of a concurrent array-based double-ended queue (deque) with a ticket lock per element according to one embodiment of the present disclosure.

The array-based concurrent deque is implemented in a fashion similar to the above implementations of the queue and the stack. FIG. 8 illustrates an array-based concurrent deque. For simplicity here, the array is not used as a circular buffer. The array-based concurrent deque uses two memory locations bottomIndex and topIndex as indices into the array. The constants BOTTOM_MOST and TOP_MOST are the boundaries of the array representing the deque. In one embodiment of the present disclosure, a lock is used per element for concurrent use. Pseudo code example defining deque data structure is illustrated below.

```
class Deque {
    private Object buffer[BUFFER_LENGTH];
    private int64_t turn[BUFFER_LENGTH];    // Lock accompanying each element.
    private int64_t putTicket[BUFFER_LENGTH]; // Initialize all elements to 1.
    private int64_t takeTicket[BUFFER_LENGTH];// Initialize all elements to 1.
    uint32_t TOP_MOST = BUFFER_LENGTH;
    uint32_t BOTTOM_MOST = 0;
    // Fetch*Atomic requires memory order: bottomIndex, topIndex.
    enum {eBottom=0, eTop=1};
    // Atomic operation on both indices typically requires them in same cache line.
    ALIGN64 uint32_t Index[2] =
    {BUFFER_LENGTH/2, BUFFER_LENGTH/2};
    public int putBottom(Object x);
    public int takeBotom(Object *x);
    public int putTop(Object x);
    public int takeTop(Object *x);
}
```

The following pseudo code illustrates an example of putting onto bottom of deque.

```
public int putBottom(Object x) {
    uint64_t myIndex;
    myIndex = fetchAndDecrementBounded32(&BOTTOM_MOST,
```

```
    &Index[eBottom]);
    if (myIndex == BOUND_REACHED32) return FULL;
    myIndex = myIndex - 1;
    int64_t myTicket = fetchAndIncrement(&putTicket[myIndex]);
    // Loop until my element has been freed by previous take.
    while (-myTicket != turn[myIndex]) ;
    // Insert element.
    Object[myIndex] = x;
    // Ensure data is seen elsewhere before lock.
    msync( );
    // Let taker know this element has been put.
    turn[myIndex] = myTicket;
    return SUCCESS;
}
```

As shown in the above pseudo-code, FetchAndDecrementBounded on counter bottomIndex and bound BOTTOM_MOST may be used to obtain the array index for a put onto the bottom of the deque. The returned value BOUND_REACHED indicates that there are no free elements at the bottom of the deque.

The following pseudo code illustrates taking from bottom of deque.

```
public int takeBottom(Object *x) {
    uint64_t myIndex;
    myIndex = fetchAndIncrementBoundedAtomic32(&Index[eTop],
        &Index[eBottom]);
    if (myIndex == BOUND_REACHED32) {
        // Try to move indices to middle to avoid bumping into ends.
        storeOnTwin32(BUFFER_LENGTH/2, &Index[eBottom],
            &Index[eTop]);
        return EMPTY;
    }
    int64_t myTicket = fetchAndIncrement(&takeTicket[myIndex]);
    // Loop until my element has been put.
    while (myTicket != turn[myIndex]) ;
    // Take element.
    *x = Object[myIndex];
    // Ensure data is taken above before flag is seen elsewhere.
    mbar( );
    // Let subsequent putter know this element has been taken and freed.
    turn[myIndex] = -(myTicket + 1);
    return SUCCESS;
}
```

As shown in the above pseudo-code, FetchAndIncrementBounded on counter bottomIndex with bound topIndex may be used to provide the array index for a take from the bottom of the deque. The returned value BOUND_REACHED indicates that there are no objects in the deque.

The following illustrates a pseudo code for putting onto top of deque.

```
public int putTop(Object x) {
    uint64_t myIndex = fetchAndIncrementBounded32(&TOP_MOST,
        &Index[eTop]);
    if (myIndex == BOUND_REACHED32) return FULL;
    int64_t myTicket = fetchAndIncrement(&putTicket[myIndex]);
    // Loop until my element has been freed by previous take.
    while (-myTicket != turn[myIndex]) ;
    // Insert element.
    Object[myIndex] = x;
    // Ensure data is seen elsewhere before lock.
    msync( );
    // Let taker know this element has been put.
    turn[myIndex] = myTicket;
    return SUCCESS;
}
```

In one embodiment, as shown in the above pseudo code, FetchAndIncrementBounded primitive on counter topIndex with bound TOP_MOST is used to obtain the array index for a put onto the top of the deque. The returned value BOUND_REACHED indicates that there are no free elements at the top of the deque.

The following pseudo code illustrates taking from top of deque

```
public int takeTop(Object *x) {
    uint64_t myIndex;
    myIndex = fetchAndDecrementBoundedAtomic32(&Index[eBottom],
        &Index[eTop]);
    if (myIndex == BOUND_REACHED32) {
        // Try to move indices to middle to avoid bumping into ends.
        storeOnTwin32(BUFFER_LENGTH/2, &Index[eBottom],
            &Index[eTop]);
        return EMPTY;
    }
        myIndex = myIndex - 1;
    int64_t myTicket = fetchAndIncrement(&takeTicket[myIndex]);
    // Loop until my element has been put.
    while (myTicket != turn[myIndex]) ;
    // Take element.
    *x = Object[myIndex];
    // Ensure data is taken above before lock is seen elsewhere.
    mbar( );
    // Let subsequent putter know this element has been taken and freed.
    turn[myIndex] = -(myTicket + 1);
    return SUCCESS;
}
```

In one embodiment, as shown in the above pseudo code, FetchAndDecrementBounded on counter topIndex with bound bottomIndex provides the array index for a take from the top of the deque. The returned value BOUND_REACHED indicates that there are no objects in the deque.

In the above take attempts from the top or bottom, when there are no objects in the deque, the synchronization primitive StoreOnTwin (BUFFER_LENGTH/2, bottomIndex, topIndex) may be used to move the topIndex and bottomIndex to the middle of the array such that future puts to the bottom or top are unlikely to bump into the end of the array. The value of BUFFER_LENGTH is the number of elements in the array. The synchronization primitive StoreOnTwin (BUFFER_LENGTH/2, bottomIndex, topIndex) may be used to make the move to ensure that there are indeed no objects in the deque, in other words, to ensure that another thread has not recently added an element.

The following pseudo code illustrates an example implementation of the StoreOnTwin primitive.

```
    // If value of *ptrFirst equals that of *ptrSecond,
    // then store value of new in both locations.
    // Returns non-0 (true) on success, else 0 (fail).
    uint32_t storeOnTwin32(uint32_t new, uint32_t *ptrFirst,
                uint32_t *ptrSecond) {
        // Required order in memory: first, second.
        assert(ptrFirst + 1 == ptrSecond);
        typedef struct {uint32_t first, uint32_t second} Pair;
        Pair *ptrPair = (Pair *)ptrFirst;
        volatile Pair valPair = load_linked64(ptrPair);
        if (valPair.first == valPair.second) {
            IncPair nextPair = { new, new };
            return store_conditional64(ptrPair, nextPair);
        } else {
            return 0;
        }
    }
```

In the StoreOnTwin (newValue, ptrFirst, ptrSecond) synchronization primitive, only if the current values stored at the memory locations ptrFirst and ptrSecond are the same, is the given newValue stored to both locations. Otherwise, the values stored at the memory locations ptrFirst and ptrSecond remain unchanged.

Figure 9:
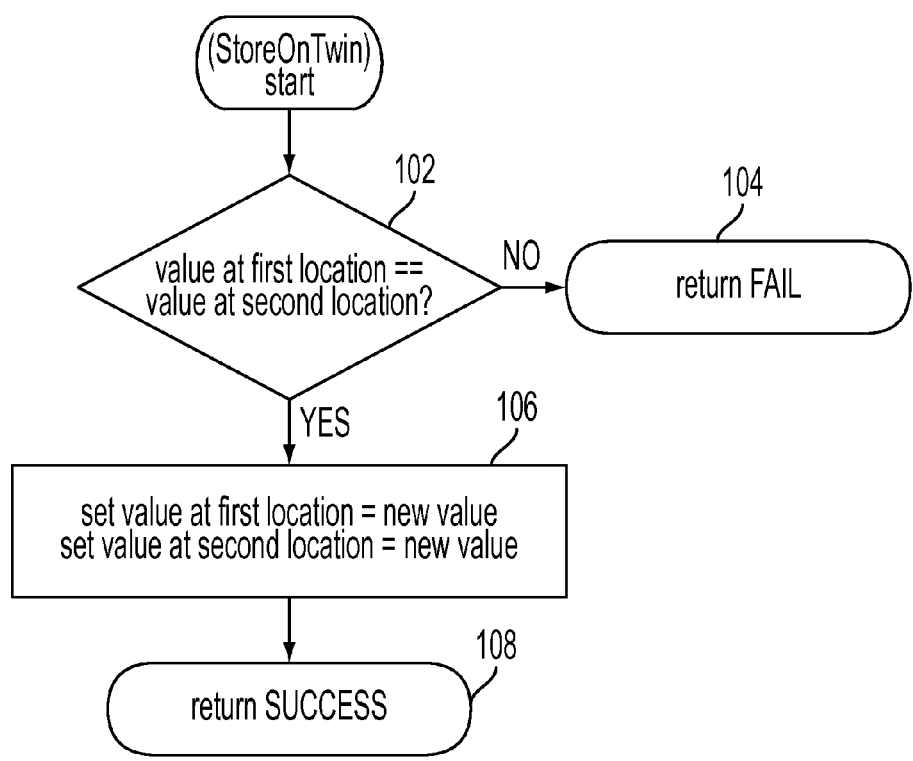
FIG. 9 is a flow diagram illustrating a StoreOnTwin32 operation according to one embodiment of the present disclosure.

FIG. 9 is a flow diagram illustrating StoreOnTwin algorithm. At 102, it is determined whether the first memory location and the second memory location initially contain the same value. At 104, if they contain different values, the algorithm returns fail status. At 106, if the memory locations initially contain the same value, the new value is stored at the first memory location and the new value is stored at the second memory location. At 108, the algorithm returns success status.

As described above, the indices of an empty deque are moved to the middle of the array. Nonetheless, because the array is not used as a circular buffer, the usage pattern of puts and takes to the top and bottom may lead to a put at the top failing, even though there are free elements at the bottom. Likewise, a put at the bottom may fail even though there are free elements at the top. A solution to this problem is the wrapped deque described below, which will put onto the top or bottom as long as there is a free element at the top or bottom.

For each element of the array-based concurrent deque, the ticket lock mechanism is the same as that described above for the stack. So the ticket lock for each element of the deque may include the 3 fields: turn, putTicket, takeTicket.

The above implementation is practical, for example with 64 bits, neither putTicket nor takeTicket set limits on practical use. FetchAndIncrementBoundedAtomic usage of the 32-bit topIndex and bottomIndex can be implemented by typical present-day 64-bit synchronization primitive load-linked/store-conditional. The 32-bit topIndex and bottomIndex restricts the deque size to about 4 Billion elements, which is far larger than the vast majority of uses. The algorithm works for an arbitrarily large or small array, down to a size of a single element.

Wrapped Double-Ended Queue (wrappedDeque)

The array-based concurrent wrappedDeque is implemented in a fashion similar to the above implementations of the deque. The difference is that for the above deque the array is not used as a circular buffer, while for the wrappedDeque here the array is used as a circular buffer. The wrappedDeque uses four memory locations bottomMost, bottomIndex, topIndex and topMost as indices into the array. In contrast to the constant BOTTOM_MOST and TOP_MOST boundaries of the unwrapped deque described above, for the wrapped deque the values of the topMost and bottomMost indices change during the operation of the wrapped deque. The following pseudo code definition example also illustrates the data structure of wrapped double-ended queue.

```
class WrappedDeque {
  private Object buffer[BUFFER_LENGTH];
  private int64_t turn[BUFFER_LENGTH];    // Lock accompanying
  each element.
  private int64_t putTicket[BUFFER_LENGTH]; // Initialize all
  elements to 1.
  private int64_t takeTicket[BUFFER_LENGTH];// Initialize all
  elements to 1.
  // Fetch*Atomic requires memory order:
  //     bottomMost, bottomIndex, topIndex, topMost.
  enum {eBottomM=0, eBottomI=1, eTopI=2, eTopM=3};
  // Start indices in the MIDDLE of uint32_t range.
  #define MIDDLE (1u<<31)
  // Atomic operation on both indices typically requires them in same
  cache line.
  ALIGN128 uint32_t Index[4] = {0 + MIDDLE,
                                BUFFER_LENGTH/2 + MIDDLE,
                                BUFFER_LENGTH/2 + MIDDLE,
                                BUFFER_LENGTH + MIDDLE};
  public int putBottom(Object x);
  public int takeBotom(Object *x);
  public int putTop(Object x);
  public int takeTop(Object *x);
}
```

The following pseudo code illustrates an algorithm for putting onto bottom of wrapped deque.

```
public int putBottom(Object x) {
  uint64_t myIndex;
  while (1) {
    myIndex =
    fetchAndDecrementBoundedAtomic32(&Index[eBottomM],
    &Index[eBottomI]);
    if (myIndex != BOUND_REACHED32) break; // Leave loop
    on success.
    // Since no free elements at bottom, try to get one from top.
    uint32_t myTopM =
    fetchAndDecrementBounded32(&Index[eTopI], &Index[eTopM]);
    if (myTopM == BOUND_REACHED32) return FULL;
    StoreDecrement(&Index[eBottomM]);
    // Moved free element from top to bottom, but another thread
    may steal it.
  }
  myIndex = (myIndex - 1) % BUFFER_LENGTH; // Wrap index
  onto array.
  int64_t myTicket = fetchAndIncrement(&putTicket[myIndex]);
  // Loop until my element has been freed by previous take.
  while (-myTicket != turn[myIndex]) ;
  // Insert element.
  Object[myIndex] = x;
  // Ensure data is seen elsewhere before lock.
  msync( );
  // Let taker know this element has been put.
  turn[myIndex] = myTicket;
  return SUCCESS;
}
```

The following pseudo code illustrates an algorithm for taking from bottom of wrapped deque.

```
Take from Bottom of Wrapped Deque
public int takeBottom(Object *x) {
  uint64_t myIndex;
  myIndex = fetchAndIncrementBoundedAtomic32(&Index[eTopI],
  &Index[eBottomI]);
  if (myIndex == BOUND_REACHED32) {
    uint32_t midpoint = Index[eBottomM]/2 + Index[eTopM]/2;
    storeOnTwin32(midpoint, &Index[eBottomI], &Index[eTopI]);
    return EMPTY;
  }
  myIndex = myIndex % BUFFER_LENGTH; // Wrap index onto array.
  int64_t myTicket = fetchAndIncrement(&takeTicket[myIndex]);
  // Loop until my element has been put.
  while (myTicket != turn[myIndex]) ;
  // Take element.
  *x = Object[myIndex];
  // Ensure data is taken above before flag is seen elsewhere.
  mbar( );
  // Let subsequent putter know this element has been taken and freed.
  turn[myIndex] = -(myTicket + 1);
  return SUCCESS;
}
```

The following pseudo code illustrates an algorithm for putting onto top of wrapped deque.

```
Put onto Top of Wrapped Deque
public int putTop(Object x) {
  uint64_t myIndex;
  while (1) {
```

-continued

```
    myIndex =
    fetchAndIncrementBoundedAtomic32(&Index[eTopM],
    &Index[eTopI]);
      if (myIndex != BOUND_REACHED32) break; // Leave loop on
    success.
    // Since no free elements at top, try to get one from bottom.
    uint32_t myBottomM =
fetchAndIncrementBounded32(&Index[eBottomI],
&Index[eBottomM]);
      if (myBottomM == BOUND_REACHED32) return FULL;
      StoreIncrement(&Index[eTopM]);
      // Moved free element from bottom to top, but another thread may
      steal it.
    }
    myIndex = myIndex % BUFFER_LENGTH; // Wrap index onto array.
    int64_t myTicket = fetchAndIncrement(&putTicket[myIndex]);
    // Loop until my element has been freed by previous take.
    while (-myTicket != turn[myIndex]) ;
    // Insert element.
    Object[myIndex] = x;
    // Ensure data is seen elsewhere before lock.
    msync( );
    // Let taker know this element has been put.
    turn[myIndex] = myTicket;
    return SUCCESS;
}
```

The following pseudo code illustrates an algorithm for taking from top of wrapped deque.

```
public int takeTop(Object *x) {
    uint64_t myIndex;
    myIndex = fetchAndDecrementBoundedAtomic32(&Index[eBottomI],
    &Index[eTopI]);
    if (myIndex == BOUND_REACHED32) {
      uint32_t midpoint = Index[eBottomM]/2 + Index[eTopM]/2;
      storeOnTwin32(midpoint, &Index[eBottomI], &Index[eTopI]);
      return EMPTY;
    }
    myIndex = (myIndex - 1 )% BUFFER_LENGTH; // Wrap index
    onto array.
    int64_t myTicket = fetchAndIncrement(&takeTicket[myIndex]);
    // Loop until my element has been put.
    while (myTicket != turn[myIndex]) ;
    // Take element.
    *x = Object[myIndex];
    // Ensure data is taken above before lock is seen elsewhere.
    mbar( );
    // Let subsequent putter know this element has been taken and freed.
    turn[myIndex] = -(myTicket + 1);
    return SUCCESS;
}
```

Put and take onto the bottom or top of the wrappedDeque is similar to these actions for a deque, as described above. The difference is that when putting to the bottom, if the bottom is full, the algorithm will use FetchAndDecrementBounded on counter topMost bounded by topIndex to try to obtain a free element from the top. On success, the free element from the top is moved to the bottom using StoreDecrement (bottomMost). Then another attempt is made to put to the bottom using FetchAndDecrementBounded on counter bottomIndex with bound bottomMost. This is illustrated in the above pseudo code example "putBottom."

Similarly, when putting to the top, if the top is full, the algorithm will use FetchAndIncrementBounded on counter bottomMost with bound bottomIndex to try to obtain a free element from the bottom. On success, the free element from the bottom is moved to the top using StoreIncrement(topMost). Then another attempt is made to put to the top using FetchAndIncrementBounded on counter topIndex with bound topMost. This is illustrated in the above pseudo code example "putTop."

Thus the wrappedDeque will successfully put onto the top or bottom as long as there is a free element at the top or bottom.

For each element of the array-based concurrent wrappedDeque, the ticket lock mechanism is the same as that described above for the stack and deque. For example, the ticket lock for each element of the deque may include the three fields: turn, putTicket, takeTicket.

The above implementation is practical, for example with 64 bits, neither putTicket nor takeTicket set limits on practical use. FetchAndIncrementBoundedAtomic usage of the 32-bit bottomMost, bottomIndex, topIndex, topMost indices can be implemented by a 64-bit synchronization primitive load-linked/store-conditional. In the worst-case usage pattern, the 32-bit indices restrict the deque throughput to about 2 billion elements, which indeed could be reached by some applications. Such an overflow of the indices could be survived by a more sophisticated implementation of the wrappedDeque. Alternatively software or hardware could provide FetchAndIncrementBoundedAtomic on 64-bit indices. In the worst-case usage pattern, such 64-bit indices allows the deque throughput to about (2 billion) times (4 billion) elements, which exceeds any possible use case. The algorithm works for an arbitrarily large or small array, down to a size of a single element.

Hardware Implementation of FetchAndIncrementBounded and Related Primitives

FIG. 10 is a block diagram illustrating the functional unit (FU) of an Active Memory Unit (AMU) with support for the new synchronization primitive FetchAndIncrementBounded. The block named FU_FetchAndIncrementBounded 202 implements the FetchAndIncrementBounded functionality. The block named FU_FetchAndIncrementBounded implements the algorithm illustrated with reference to FIG. 1. As shown, the FU 208 determines the instruction type of the instruction 204 from the AMU issue queue 206. At 210, if the instruction is load instruction, the FU executes the load primitive at 212. At 214, if the instruction is store instruction, the FU executes the store primitive at 216. At 218, if the instruction is fetch and increment instruction, the FU executes the fetch and increment primitive at 220. At 222, if the instruction is fetch and increment bounded instruction, the FU executes the fetch and increment bounded primitive of the present disclosure at 202. Similar to the above description of FetchAndIncrementBounded, there may be a similar implementation of the new synchronization primitives FetchAndIncrementBounded Atomic, FetchAndDecrementBounded, FetchAndDecrementBoundedAtomic and StoreOnTwin.

The four new synchronization primitives FetchAndIncrementBounded, FetchAndDecrementBounded, FetchAndIncrementBoundedAtomic, FetchAndDecrementBoundedAtomic, may be implemented in computer hardware by having a processor core issue a normal load to a special memory address. The memory subsystem recognizes the special address and performs the synchronization primitive. The special address encodes the actual memory address of the Counter variable to be operated on and encodes which of the four synchronization primitives is to be performed. The Bound variable may be defined to be in a memory location adjacent to the Counter variable, either before or after. This adjacency may be met in practical use, for example for the indices of the concurrent queue, stack and deque, respectively.

When many threads concurrently issue one of the four synchronization primitives to the same Counter memory location, such a hardware implementation can satisfy a primitive every few processor clock cycles.

The Bound variable and the Counter variable may be required to be in the same cache line or other memory block used by the memory subsystem. A memory subsystem atomically may implement an operation on a cache line. Thus in a hardware implementation, FetchAndIncrementBounded may be identical to FetchAndIncrementBoundedAtomic. Likewise, the hardware implementation of FetchAndDecrementBounded may be identical to that of FetchAndDecrementBoundedAtomic.

In an array-based queue, the three 64-bit indices of the concurrent queue may have a total of 192 bits. The same 192 bit total may be given by the three 64-bit indices of the concurrent stack. The four 32-bit indices of the concurrent deque may have a total of 128 bits. Alternatively, the four 64-bit indices of the concurrent deque may have a total of 256 bits. These totals of 192 or 128 or 256 bits may fit within a cache line, as required in some practical implementations.

The hardware implementation of StoreOnTwin is similar to that described above for FetchAndIncrementBounded and its variations. The new synchronization primitive StoreOnTwin may be implemented in computer hardware by having a processor core issue a normal store to a special memory address. The memory subsystem recognizes the special address and performs the synchronization primitive. The special address encodes the actual memory address of the first of the twin memory addresses and that the StoreOnTwin synchronization primitive is to be performed. The second of the twin memory addresses may be defined to be in a memory location subsequent to the memory address of the first twin. This adjacency may be met in practice, for example, for the bottomIndex and topIndex twins given to this primitive in the implementation of the deque and the wrapped deque.

Performance of Concurrent Queues, Stacks and Deques

As described above, access to the concurrent data structure is split into two parts. In the first part, a thread uses the new synchronization primitive fetch-and-increment-bounded in order for the thread to be assigned to an element in the data structure. The bounded part returns no element if there is no element available. As described below, the fetch-and-increment-bounded primitive has very high throughput in assigning threads to elements and this largely determines the throughput of the data structure. The other new primitives serve similar purposes to fetch-and-increment-bounded. In the second part, the thread uses a ticket lock in order to coordinate with other threads assigned to the element. This embodiment allows multiple threads to concurrently use multiple elements of the data structure and thus achieve high performance. According to another embodiment, there are also provided new synchronization primitives FetchAndDecrementBounded and StoreOnTwin which are similarly used to assign a thread to an element of a concurrent data structure.

Unlike the new fetch-and-increment-bounded of the present disclosure, the known fetch-and-increment without the bound can return an element which is not ready to be assigned. For example, a consumer could get an element for which no producer has yet been assigned, and thus the consumer might have to wait arbitrarily long until that producer is assigned.

The concurrent stacks, queues and deques of present disclosure are non-blocking. Usage of concurrent queues may be across different elements. Usage of concurrent stacks or deques can be across different elements if an application phase of puts is followed by a phase of takes. Usage of deques also can be across different elements if puts are to one end and takes are at the other end.

The concurrent stacks, queues and deques of present disclosure are blocking within the same element of the array. In other words, a pre-empted or otherwise blocked putter or taker will block subsequent putters and takers of that particular array element.

When many threads concurrently issue fetch-and-increment to the same memory location, a hardware implementation in the memory subsystem typically can satisfy a fetch-and-increment operation every few processor clock cycles. Similarly, a hardware implementation could satisfy the new synchronization primitives every few processor clock cycles: FetchAndIncrementBounded, FetchAndDecrementBounded, FetchAndIncrementBoundedAtomic, FetchAndDecrementBoundedAtomic or StoreOnTwin.

In the limit of a large number of threads (typically greater than of order 10 threads) and small element size (typically less than 100 bytes per element), the queue throughput is dominated by the throughput of the FetchAndIncrementBounded primitive. This primitive can be implemented in hardware and thus promises a very fast queue throughput up to of order 100 million elements per second given present-day clock speeds of order 1 GHz. For the application usage patterns mentioned above, this throughput can also be achieved for stacks and deques.

Figure 11:
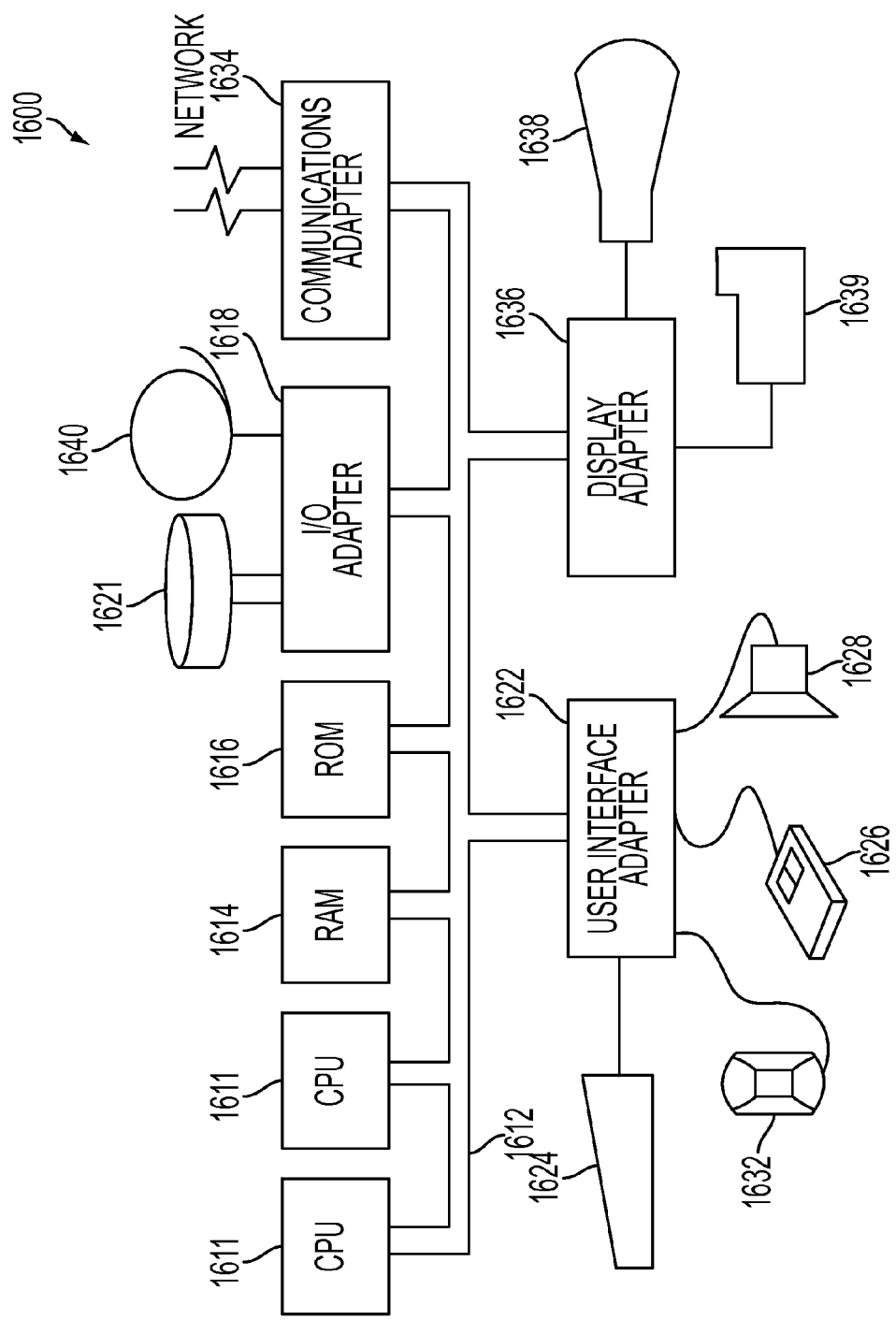
FIG. 11 illustrates an example hardware configuration according to one embodiment of the present disclosure.

FIG. 11 illustrates a hardware configuration of a computing system 1600 executing and/or implementing the method steps described above. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for concurrent operation in a multithreaded computing environment, the method comprising:
fetching a counter and comparing the counter to a boundary, by one or more of a plurality of synchronization primitives, wherein the plurality of synchronization primitives comprise at least:
FetchAndIncrementBounded, the FetchAndIncrementBounded outputting the counter and then incrementing the counter if the counter is less than the boundary, the FetchAndIncrementBounded outputting an indication of reaching a bound of a data structure if the counter is not less than the boundary;
FetchAndDecrementBounded, the FetchAndDecrementBounded outputting the counter and then decrementing the counter if the counter is greater than the boundary, the FetchAndDecrementBounded outputting an indication of reaching a bound of a data structure if the counter is not greater than the boundary; and
StoreOnTwin, the StoreOnTwin setting the counter and the boundary to a given value if a value of the counter and a value of the boundary are equivalent to each other, said StoreOnTwin not changing the value of the counter or the value of the boundary if the value of the counter and the value of the boundary are not equivalent;
constructing a concurrent array-based data structure, each element of the concurrent array-based data structure having a ticket lock for granting an access to the element of the concurrent array-based data structure if a thread has a corresponding ticket; and
concurrently operating said concurrent array-based data structure using at least one of the plurality of synchronization primitives, the at least one of the plurality of synchronization primitives being one of the FetchAndIncrementBounded and the FetchAndDecrementBounded,
wherein said concurrent array-based data structure is a double-ended queue (deque), and said step of concurrently operating comprises obtaining an index to an element for putting an object on a top of the deque by executing the FetchAndIncrementBounded, obtaining an index to an element for taking an object on the top of the deque by executing the FetchAndDecrementBounded, obtaining an index to an element for putting an object on a bottom of the deque by executing the FetchAndDecrementBounded and obtaining an index to an element for taking an element on the bottom of the deque by executing the FetchAndIncrementBounded; and
wherein the StoreOnTwin resets a first pointer referencing a top of said deque and a second pointer referencing a bottom of said deque to reference a middle of the deque if the first pointer equals the second pointer.

2. The method of claim 1, wherein the FetchAndIncrementBounded and the FetchAndDecrementBounded are implemented in a memory system and wherein the counter and the boundary are stored in adjacent memory locations.

3. A system for concurrent operation in a multithreaded computing environment, the system comprising:
a hardware processor;
one or more synchronization primitives of a plurality of synchronization primitives executable on the hardware processor, each of the one or more synchronization primitives fetching a counter and comparing the counter to a boundary, wherein the plurality of synchronization primitives comprise at least:
FetchAndIncrementBounded, the FetchAndIncrementBounded outputting the counter and then incrementing the counter if the counter is less than the boundary, the FetchAndIncrementBounded outputting an indication of reaching a bound of a data structure if the counter is not less than the boundary;
FetchAndDecrementBounded, the FetchAndDecrementBounded outputting the counter and then decrementing the counter if the counter is greater than the boundary, the FetchAndDecrementBounded outputting an indication of reaching a bound of a data structure if the counter is not greater than the boundary; and
StoreOnTwin, the StoreOnTwin setting the counter and the boundary to a given value if a value of the counter and a value of the boundary are equivalent to each other, said StoreOnTwin not changing the value of the counter or the value of the boundary if the value of the counter and the value of the boundary are not equivalent;
a processing unit for constructing a concurrent array-based data structure, each element of the concurrent array-based data structure having a ticket lock that grants an access to the element of the concurrent array-based data structure if a thread has a corresponding ticket; and
a functional unit for concurrently operating the concurrent array-based data structure using at least one of the plurality of synchronization primitives,
wherein said concurrent array-based data structure is a double-ended queue (deque), and said functional unit is further operable to obtain an index to an element for putting an object on a top of the deque by executing the FetchAndIncrementBounded, obtain an index to an element for taking an object on the top of the deque by executing the FetchAndDecrementBounded, obtain an index to an element for putting an object on a bottom of the deque by executing the FetchAndDecrementBounded, and obtain an index to an element for taking an element on the bottom of the deque by executing the FetchAndIncrementBounded; and
wherein the StoreOnTwin resets a first pointer referencing a top of said deque and a second pointer referencing a bottom of said deque to reference a middle of the deque if the first pointer equals the second pointer.

4. The system according to claim 3, wherein said deque is a wrapped deque, wherein if said top of said wrapped deque is full, said functional unit is further operable to put to said top of said wrapped deque using FetchAndIncrementBounded to move a free element from said bottom of said wrapped deque to said top of said wrapped deque if a free element on said bottom of said deque is found, and wherein if said bottom of said wrapped deque is full, said functional unit is further operable to put to said bottom of said wrapped deque using FetchAndDecrementBounded to move a free element from said top of said wrapped deque to said bottom of said wrapped queue if a free element on said top of said deque is found.

5. The system of claim 3, further comprising a memory system wherein the FetchAndIncrementBounded and the FetchAndDecrementBounded are implemented in the memory system and wherein the counter and the boundary are stored in adjacent memory locations of the memory system.

6. A non-transitory program memory device readable by a machine, the device tangibly embodying a program of instructions executable by the machine to perform a method for concurrent operation in a multithreaded computing environment, the method comprising:
- fetching a counter and comparing the counter to a boundary, by one or more synchronization primitives of a plurality of synchronization primitives, wherein the plurality of synchronization primitives comprise at least:
- FetchAndIncrementBounded, the FetchAndIncrementBounded outputting the counter and then incrementing the counter if the counter is less than the boundary, the FetchAndIncrementBounded outputting an indication of reaching a bound of a data structure if the counter is not less than the boundary;
- FetchAndDecrementBounded, the FetchAndDecrementBounded outputting the counter and then decrementing the counter if the counter is greater than the boundary, the FetchAndDecrementBounded outputting an indication of reaching a bound of a data structure if the counter is not greater than the boundary; and
- StoreOnTwin, the StoreOnTwin setting the counter and the boundary to a given value if a value of the counter and the value of the boundary are equivalent to each other, said StoreOnTwin not changing the value of the counter or the value of the boundary if the value of the counter and the value of the boundary are not equivalent.

7. The program memory device of claim 6, wherein the method further comprises:
- constructing a concurrent array-based data structure, each element of the concurrent array-based data structure having a ticket lock for granting an access to the element of the concurrent array-based data structure if a thread has a corresponding ticket; and
- concurrently operating said concurrent array-based data structure using at least one of the plurality of synchronization primitives, the at least one of the plurality of synchronization primitives being one of the FetchAndIncrementBounded and the FetchAndDecrementBounded.

8. The program memory device of claim 7, wherein said concurrent array-based data structure is a queue, and said step of concurrently operating comprises obtaining an index to an element for a put operation by executing the FetchAndIncrementBounded and obtaining an index to an element for a take operation by executing the FetchAndIncrementBounded.

9. The program memory device according to claim 8, wherein said index into the concurrent array-based queue for at least one of the put operation and the take operation is also used to calculate an expected ticket lock value for said element for the at least one of the put operation and the take operation.

10. The program memory device of claim 7, wherein said concurrent array-based data structure is a stack, and said step of concurrently operating comprises obtaining an index to an element for a put operation by executing the FetchAndIncrementBounded and obtaining an index to an element for a take operation by executing the FetchAndDecrementBounded.

11. The program memory device of claim 7, wherein said concurrent array-based data structure is a double-ended queue (deque), and said step of concurrently operating comprises obtaining an index to an element for putting an object on a top of the deque by executing the FetchAndIncrementBounded, obtaining an index to an element for taking an object on the top of the deque by executing the FetchAndDecrementBounded, obtaining an index to an element for putting an object on a bottom of the deque by executing the FetchAndDecrementBounded and obtaining an index to an element for taking an element on the bottom of the deque by executing the FetchAndIncrementBounded.

12. The program memory device according to claim 11, wherein said deque is a wrapped deque, wherein if said top of said wrapped deque is full, putting to said top of said wrapped deque uses FetchAndIncrementBounded to move a free element from said bottom of said wrapped deque to said top of said wrapped deque if a free element on said bottom of said deque is found, and wherein if said bottom of said wrapped deque is full, putting to said bottom of said wrapped deque uses FetchAndDecrementBounded to move a free element from said top of said wrapped deque to said bottom of said wrapped queue if a free element on said top of said deque is found.

13. The program memory device of claim 11, further comprising the StoreOnTwin resetting a first pointer referencing a top of said deque and a second pointer referencing a bottom of said deque to reference a middle of the deque if the first pointer equals the second pointer.

\* \* \* \* \*